(12) United States Patent
Saito

(10) Patent No.: US 9,919,301 B2
(45) Date of Patent: Mar. 20, 2018

(54) PHOTOCATALYST-SUPPORTING STRUCTURE

(71) Applicant: NIPPON SODA CO., LTD., Tokyo (JP)

(72) Inventor: Kazunori Saito, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 0 days.

(21) Appl. No.: 14/359,863

(22) PCT Filed: Nov. 20, 2012

(86) PCT No.: PCT/JP2012/080049
§ 371 (c)(1),
(2) Date: May 21, 2014

(87) PCT Pub. No.: WO2013/077315
PCT Pub. Date: May 30, 2013

(65) Prior Publication Data
US 2014/0323290 A1    Oct. 30, 2014

(30) Foreign Application Priority Data

Nov. 25, 2011  (JP) ................................ 2011-257834

(51) Int. Cl.
*B01J 31/00* (2006.01)
*B01J 31/26* (2006.01)
*C09J 157/10* (2006.01)
*B01J 35/00* (2006.01)

(52) U.S. Cl.
CPC ............. *B01J 31/26* (2013.01); *C09J 157/10* (2013.01); *B01J 35/004* (2013.01)

(58) Field of Classification Search
CPC ................................ B01J 35/004; B01J 31/26
See application file for complete search history.

(56) References Cited

U.S. PATENT DOCUMENTS

| | | | | |
|---|---|---|---|---|
| 4,486,565 | A * | 12/1984 | Benjamin ............ | C09D 133/06 427/379 |
| 4,826,907 | A * | 5/1989 | Murao et al. ................. | 524/394 |
| 5,814,374 | A * | 9/1998 | Nkansah et al. .............. | 427/386 |
| 5,852,095 | A * | 12/1998 | Yamauchi ................. | C08F 8/42 524/262 |
| 6,228,480 | B1 * | 5/2001 | Kimura et al. ............... | 428/328 |
| 8,932,397 | B2 | 1/2015 | Ishibai et al. | |
| 2006/0222870 | A1 * | 10/2006 | Inokuchi ............. | C09D 183/08 428/447 |
| 2009/0305050 | A1 * | 12/2009 | Nakane ................. | C08F 257/02 428/422.8 |
| 2010/0010145 | A1 | 1/2010 | Matsuzawa et al. | |
| 2012/0168649 | A1 | 7/2012 | Ishibai et al. | |

FOREIGN PATENT DOCUMENTS

| | | |
|---|---|---|
| CN | 1142834 A | 2/1997 |
| CN | 1288775 A | 3/2001 |
| CN | 1515352 A | 7/2004 |
| CN | 101517021 A | 8/2009 |
| EP | 0 757 059 A1 | 2/1997 |
| EP | 1 473 331 A1 | 11/2004 |
| JP | A-2-150475 | 6/1990 |
| JP | A-4-175343 | 6/1992 |
| JP | A-6-25369 | 2/1994 |
| JP | A-6-322052 | 11/1994 |
| JP | A-8-120085 | 5/1996 |
| JP | A-9-169818 | 6/1997 |
| JP | A-10-36514 | 2/1998 |
| JP | A-10-329427 | 12/1998 |
| JP | A-2001-199163 | 7/2001 |
| JP | A-2001-286766 | 10/2001 |
| JP | A-2002-45705 | 2/2002 |
| JP | A-2002-88126 | 3/2002 |
| JP | A-2004-143452 | 5/2004 |
| JP | A-2004-149668 | 5/2004 |
| JP | A-2005-350580 | 12/2005 |
| JP | 2008-038113 A | 2/2008 |
| JP | A-2008-38116 | 2/2008 |
| WO | WO 97/00134 A1 | 1/1997 |
| WO | 2010/143645 A1 | 12/2010 |

OTHER PUBLICATIONS

Office Action issued in Taiwanese Patent Application No. 101143176 dated May 21, 2014 (with partial translation).
International Search Report issued in International Patent Application No. PCT/JP2012/080049 dated Mar. 5, 2013.
Feb. 25, 2015 Chinese Office Action issued in Chinese Application No. 201280056808.0.
Nov. 4, 2015 Chinese Office Action issued in Chinese Application No. 201280056808.0.
Oct. 26, 2015 Extended European Search Report issued in European Application No. 12850965.0.
May 23, 2016 Notice of Grounds for Rejection issued in Korean Application No. 2016-7006443.
Jan. 30, 2018 Notice of Allowance issued in U.S. Appl. No. 15/416,313.

* cited by examiner

*Primary Examiner* — Melvin C. Mayes
*Assistant Examiner* — Stephanie J Cohen
(74) *Attorney, Agent, or Firm* — Oliff PLC

(57) ABSTRACT

An object of the invention of the present application is to provide a photocatalyst-carrying structure provided with a carrier and a photocatalyst layer carried on the carrier with an adhesive layer there between, wherein the adhesive layer for carrying the photocatalyst does not contain a volatile organic compound as solvent. An aqueous silicone-modified resin is preferably used for the adhesive layer, and the aqueous silicone-modified resin is preferably a resin obtained by emulsion polymerization of a monomer in the presence of an emulsifier in an aqueous medium, and is further modified with silicone using a compound having a silicone structure.

9 Claims, No Drawings

PHOTOCATALYST-SUPPORTING STRUCTURE

TECHNICAL FIELD

The present invention relates to a photocatalyst-carrying structure on which is carried a photocatalyst used for antifouling, water purification, deodorizing, sterilization, wastewater treatment, hydrolysis, inhibition of algae growth and in various chemical reactions.

The present application claims priority on the basis of Japanese Patent Application No. 2011-157834, filed in Japan on Nov. 25, 2011, the contents of which are incorporated herein by reference.

BACKGROUND ART

In the past, in order to carry a photocatalyst on a carrier composed of an organic material such as resin, a silicone-modified resin, or resin containing a fixed amount of colloidal silica or polysiloxane, was to be dissolved in an organic solvent such as xylene, and the dissolved resin was first coated onto a carrier to form an adhesive layer (see, for example, Patent Document 1).

PRIOR ART DOCUMENTS

Patent Documents

Patent Document 1: International Publication No. WO 1997/00134

DISCLOSURE OF THE INVENTION

Problems to be Solved by the Invention

However, since an adhesive layer used to carry a photocatalyst on a carrier conventionally used a volatile organic compound as a solvent, it was unable to be used indoors and the like in terms of the work environment.

An object of the invention of the present application is to provide an adhesive layer for a photocatalyst carrier that does not contain a volatile organic compound as a solvent.

Means for Solving the Problems

As a result of conducting extensive studies to solve the aforementioned problems, the inventors of the present invention found that the aforementioned problems can be solved by using an aqueous silicone-modified resin, thereby leading to completion of the present invention.

Namely, the present invention relates to a photocatalyst-carrying structure provided with a carrier and a photocatalyst layer carried on the carrier with an adhesive layer there between, wherein the aforementioned adhesive layer contains an aqueous silicone-modified resin, the aforementioned aqueous silicone-modified resin is preferably a resin obtained by emulsion polymerization of a monomer in the presence of an emulsifier in an aqueous medium and further modified with silicone using a compound having a silicone structure, and the aforementioned aqueous silicone-modified resin is preferably an aqueous silicone-modified (meth)acrylic resin.

In addition, the aforementioned monomer preferably consists of a (meth)acrylate monomer selected from the group consisting of acrylic acid esters, methacrylic acid esters and mixtures thereof, and at least one type of comonomer selected from the group consisting of acrylamide monomers, methacrylamide monomers, vinyl monomers, ethylenic unsaturated monomers having a carboxylic acid group, vinyl cyanides, aromatic vinyl monomers, vinyl halides, butadiene and ethylene that is capable of copolymerizing with the aforementioned (meth)acrylate monomer, the amount of the aforementioned (meth)acrylate monomer in the aforementioned monomer is preferably 90% by weight to 100% by weight, the amount of the aforementioned comonomer is preferably 0% by weight to 10% by weight, and the aforementioned (meth)acrylate monomer preferably contains a cycloalkyl ester of (meth)acrylic acid having 5 to 12 carbon atoms, or a mixture thereof, in an amount equal to 5% by weight or more based on the total weight of the aforementioned monomer.

In addition, the aforementioned emulsifier is preferably at least one type selected from the group consisting of an ethylenic unsaturated monomer having a sulfonic acid group or sulfonate group, an ethylenic unsaturated monomer having a sulfuric acid ester group, and a mixture thereof, the aforementioned compound having a silicone structure is preferably at least one type selected from the group of compounds represented by the following formula (I):

[Chemical Formula 1]

$$(R_1)_n Si(OR_2)_{4-n} \qquad (I)$$

(wherein, $R_1$ represents a hydrogen atom, an aliphatic hydrocarbon group having 1 to 16 carbon atoms, an aryl group having 6 to 10 carbon atoms, a heteroaryl group having 4 to 5 carbon atoms, an aralkyl group having 7 to 11 carbon atoms, a cycloalkyl group having 5 to 6 carbon atoms, a vinyl group or a (meth)acroyloxyalkyl group having 1 to 10 carbon atoms, represents an alkyl group having 1 to 8 carbon atoms, an acyl group or a hydrogen atom, n represents 1 or 2, in the case n is 2, $R_1$ may be the same or different or $R_1$ may mutually bond to form a ring, and $R_2$ may be the same or different), or a cyclic polysiloxane, the aforementioned compound having a silicone structure is more preferably a mixture of at least one type of selected from the group consisting of compounds in which n is 1 in formula (I) and at least one type selected from the group consisting of compounds in which n is 2, and in the aforementioned compound having a silicone structure, the ratio between at least one type selected from the group consisting of compounds in which n is 1 in formula (I) and at least one type selected from the group consisting of compounds in which n is 2 is more preferably a molar ratio of 1/10 or more.

In addition, the aforementioned photocatalyst layer is preferably composed of a photocatalyst particle complex containing 25% by weight to 95% by weight of a metal oxide gel or metal hydroxide gel.

In addition, the adhesive layer preferably further contains at least one type selected from the group consisting of (poly)ethylene glycol, (poly)ethylene glycol monoalkyl ethers, (poly)ethylene glycol esters, (poly)ethylene glycol ether esters, (poly)propylene glycol, (poly)propylene glycol monoalkyl ethers, (poly)propylene glycol esters and (poly) propylene glycol ether esters.

Moreover, the present invention relates to a composition for forming an adhesive layer that contains an aqueous silicone-modified resin. The aforementioned composition for forming an adhesive layer preferably contains at least one type selected from the group consisting of (poly) ethylene glycol, (poly)ethylene glycol monoalkyl ethers, (poly)ethylene glycol esters, (poly)ethylene glycol ether esters, (poly)propylene glycol, (poly)propylene glycol monoalkyl ethers, (poly)propylene glycol esters and (poly) propylene glycol ether esters.

Effects of the Invention

In the present invention, an adhesive layer for carrying a photocatalyst is provided that does not contain a volatile organic compound as solvent by using an aqueous silicone-modified resin. Consequently, the adhesive layer of the present invention can be used indoors and the like in terms of the work environment.

BEST MODE FOR CARRYING OUT THE INVENTION

Although there are no particular limitations on the material of the carrier, specific examples thereof include glass, resin, regenerated fiber, natural fiber, metal and wood.

There are also no particular limitations on the form of the carrier, and may beef any form such as a film, plate, sphere or fiber. The thickness (diameter) of the carrier in order to firmly carry the photocatalyst layer is preferably 10 μm or more.

The invention of present application is composed of an adhesive layer containing an aqueous silicone-modified resin.

Although there are no particular limitations on the aqueous silicone-modified resin provided it partially has silicone bonds in a molecule thereof, specific examples thereof include aqueous silicone-modified (meth)acrylic resin, aqueous silicone-modified epoxy resin and aqueous silicone-modified polyester resin. More specifically, examples thereof include aqueous silicone resins described in Japanese Unexamined Patent Application, First Publication No. H2-150475, Japanese Unexamined Patent Application, First Publication No H6-25369, Japanese Unexamined Patent Application, First Publication No. H6-3322052, Japanese Unexamined Patent Application, First Publication No. H8-120085, Japanese Unexamined Patent Application, First Publication No. H10-329427 and Japanese Unexamined Patent Application, First Publication No. 2001-199163, and among these, aqueous silicone-modified (meth)acrylic resin is preferable.

Examples of monomers used in the aqueous silicone-modified (meth)acrylic resin include alkyl esters of (meth) acrylic acid having 1 to 18 carbon atoms, hydroxyalkyl esters of (meth)acrylic acid having 1 to 18 carbon atoms, (poly)oxyalkylene mono(meth)acrylates having 1 to 100 alkylene oxide groups, and (poly)oxyalkylene di(meth)acrylates having 1 to 100 alkylene oxide groups.

Specific examples include alkyl esters of (meth)acrylic acid having 1 to 18 carbon atoms such as methyl(meth) acrylate, ethyl(meth)acrylate, n-butyl(meth)acrylate, isobutyl(meth)acrylate, 2-ethylhexyl(meth)acrylate or dodecyl (meth)acrylate, hydroxyalkyl esters of (meth)acrylic acid having 1 to 18 carbon atoms such as 2-hydroxyethyl(meth) acrylate or 2-hydroxypropyl(meth)acrylate, (poly)oxyalkylene mono(meth)acrylates having 1 to 100 alkylene oxide groups such as ethylene glycol(meth)acrylate, ethylene glycol methoxy(meth)acrylate, diethylene glycol(meth)acrylate, diethylene glycol methoxy(meth)acrylate, tetraethylene glycol(meth)acrylate, tetraethylene glycol methoxy(meth) acrylate, propylene glycol(meth)acrylate, propylene glycol methoxy(meth)acrylate, dipropylene glycol(meth)acrylate, dipropylene glycol methoxy(meth)acrylate, tetrapropylene glycol(meth)acrylate or tetrapropylene glycol methoxy (meth)acrylate, (poly)oxyalkylene di(meth)acrylates having 1 to 100 alkylene oxide groups such as ethylene glycol di(meth)acrylate, diethylene glycol di(meth)acrylate, triethylene glycol di(meth)acrylate or tetraethylene glycol di(meth)acrylate, glycidyl(meth)acrylate and trimethylolpropane tri(meth)acrylate.

In addition, the aforementioned monomer preferably consists of a (meth)acrylate monomer selected from the group consisting of acrylic acid esters, methacrylic acid esters and mixtures thereof, and at least one type of comonomer selected from the group consisting of (meth)acrylamide monomers, vinyl monomers, ethylenic unsaturated monomers having a carboxylic acid group, vinyl cyanides, aromatic vinyl monomers, vinyl halides, butadiene and ethylene that is capable of copolymerizing with the aforementioned (meth)acrylate monomer.

Specific examples of comonomers include (meth)acrylamide monomers such as (meth)acrylamide, diacetone (meth)acrylamide, N-methylol(meth)acrylamide or N-butoxymethyl(meth)acrylamide, vinyl monomers such as vinyl acetate, vinyl propionate vinyl versatate, vinyl pyrrolidone or methyl vinyl ketone, vinyl cyanides such as acrylonitrile or methacrylonitrile, aromatic vinyl monomers such as vinyl toluene, styrene or α-methylstyrene, and vinyl halides such as vinyl chloride or vinylidene chloride.

In the present invention, the aforementioned comonomer is preferably an ethylenic unsaturated monomer having a carboxylic acid group, and is preferably at least one type selected from the group consisting of acrylic acid, methacrylic acid, itaconic acid and hemiesters thereof, fumaric acid and hemiesters thereof, and maleic acid and hemiesters thereof.

Among the aforementioned monomers, the amount of the aforementioned (meth)acrylate monomer is preferably 90% by weight to 100% by weight, the amount of the aforementioned comonomer is preferably 0% by weight to 10% by weight, and the aforementioned (meth)acrylate monomer preferably contains a cycloalkyl ester of (meth)acrylic acid having 5 to 12 carbon atoms in an amount equal to 5 by weight or more based on the total weight of the aforementioned monomer.

In particular, the aforementioned cycloalkyl group is preferably a cyclopentyl group, cyclohexyl group or cyclodocecyl group, and may have an alkyl group having 1 to 6 carbon atoms, a hydroxyl group or an epoxy group as a substituent thereof. Specific examples of cycloalkyl esters of (meth)acrylic acid having 5 to 12 carbon atoms include cyclohexyl(meth)acrylate, 2-hydroxycyclohexyl(meth)acrylate, methylcyclohexyl(meth)acrylate and 2,3-cyclohexene oxide(meth)acrylate.

Although there are no particular limitations on the method used to produce the aqueous silicone-modified resin, and specific examples thereof include the production methods described in the previously exemplified patent documents, a more specific example thereof consists of subjecting a monomer to emulsion polymerization in the presence of an emulsifier in an aqueous medium, and modifying with silicone using a compound having a silicone structure either during or after the emulsion polymerization.

Although there are no particular limitations on the emulsifier used provided it has an emulsifying action, a compound having an ethylenic unsaturated bond having a sulfonic acid group, sulfonate group or sulfuric acid ester group is preferable.

The ethylenic unsaturated bond is preferably a radical polymerizable double bond, and the sulfonic acid group is preferably an ammonium salt or alkaline metal salt (ammonium sulfonate group or alkaline metal sulfonate group).

The aforementioned compound having an ethylenic unsaturated bond is preferably a compound having a substituent selected from the group consisting of an alkyl group having 1 to 20 carbon atoms, an alkyl ether group having 2 to 4 carbon atoms, a polyalkyl ether group having 2 to 4 carbon atoms, an aryl group having 6 to 10 carbon atoms, and a succinic acid group, and a vinyl sulfonate compound having a vinyl group for the substituent of the sulfonic acid, group is more preferable.

Specific examples of the aforementioned compound having an ethylenic unsaturated bond include ELEMINOL (trade name) JS-2 manufactured by Sanyo Chemical Industries Co., Ltd., LATEMUL (trade name) S-120, S-180A and S-180 manufactured by Kao Co., Ltd. AQUALON (trade name) HS-10 manufactured by Dai-ichi Kogyo Seiyaku Co., Ltd., ADEKA REASOAP (trade name) SE-1025N manufactured by Adeka Co., Ltd., and vinyl sulfonate compounds having a vinyl group bound to a group in the form of an ammonium salt, sodium salt or potassium salt of p-styrenesulfonic acid, an ammonium salt, sodium salt or potassium salt of methylpropanesulfonic acid acrylamide, an ammonium salt, sodium salt or potassium salt of acrylic acid sulfoalkyl ester, an ammonium salt, sodium salt or potassium salt of methacrylic acid sulfoalkyl ester, or an ammonium salt, sodium salt or potassium salt of a sulfonic acid group.

A compound represented by the following formula (I):

[Chemical Formula 2]

$$(R_1)_n Si(OR_2)_{4-n} \quad\quad (I)$$

or a cyclic polysiloxane can be preferably used for the compound having a silicone structure.

In the above formula, specific examples of $R_1$ include aliphatic hydrocarbon groups having 1 to 16 carbon atoms such as a hydrogen atom, methyl group, ethyl group, n-propyl group, isopropyl group, n-butyl group, s-butyl group, isobutyl group or n-decyl group, heteroaryl groups having 4 to 5 carbon atoms such as a furanyl group, aralkyl groups having 7 to 11 carbon atoms such as a benzyl group or phenethyl group, aryl groups having 6 to 10 carbon atoms such as a phenyl group or naphthyl group, cycloalkyl groups having 5 to 6 carbon atoms such as a cyclopentyl group or cyclohexyl group, a vinyl group, and (meth)acroyloxyalkyl groups having 1 to 10 carbon atoms such as a (meth)acroyloxypropyl group or (meth)acroyloxyethyl group.

In the above formula, $R_2$ represents an alkyl group having 1 to 8 carbon atoms such as a methyl group, ethyl group, n-propyl group, isopropyl group, n-butyl group, s-butyl group or isobutyl group, an acyl group such as an acetyl group, benzoyl group or propanoyl group, or a hydrogen atom.

n represents 1 or 2, and in the case n is 2, $R_1$ may be the same or different or $R_1$ may mutually bond to form a ring, and $R_2$ may be the same or different.

Although at least two or more types selected from the group consisting of compounds in which n in formula (I) is 1, or at least two or more types selected from the group consisting of compounds in which n in formula (I) is 2, may be used as a mixture for the aforementioned compound having a silicone structure used in the invention of the present application, a mixture of at least one type selected from the group consisting of compounds in which n is 1 and at least one type selected from the group consisting of compounds in which n is 2 is more preferable, and the ratio thereof is preferably a molar ratio of 1/10 or more (n=1/n=2).

A partially or completely hydrolyzed or condensed linear polysiloxane (including oligomers) can also be used for the silane compound represented by formula (I).

In the aforementioned formula (I), $R_1$ is preferably a methyl group, phenyl group, vinyl group or γ-(meth)acryloxypropyl group, and $R_2$ is preferably a methyl group, ethyl group, n-propyl group, n-butyl group, 1-methoxyethyl group or hydrogen atom.

Specific examples of silane compounds represented by the aforementioned formula (I) include trimethoxysilane, phenyltrimethoxysilane, methyltriethoxysilane, phenyltriethoxysilane, isobutyltrimethoxysilane, vinyltriethoxysilane, γ-acryloxypropyltrimethoxysilane, γ-acryloxypropyltriethoxysilane, γ-methacryloxypropyltrimethoxysilane, γ-methacryloxypropyltriethoxysilane, dimethyldimethoxysilane, diphenyldimethoxysilane, dimethyldiethoxysilane, diphenyldiethoxysilane, methylphenyldimethoxysilane, and γ-methacryloxypropylmethyldimethoxysilane, while specific examples of cyclic silanes include octamethylcyclotetrasiloxane, octaphenylcyclosiloxane, hexamethylcyclotrisiloxane, decamethylcyclopentasiloxane, and tetramethyltetravinylcyclotetrasiloxane.

A silane compound represented by the aforementioned formula (I) in which n=1, a silane compound represented by the aforementioned formula (I) in which n=2, and a cyclic silane compound are preferably used in combination for the compound having a silicone structure, and a compound equivalent to a compound in which n=0 in formula (I) such as tetraalkoxysilane (provided that a hydrolyzable group such as a halogen is contained for the $OR_2$ moiety), and a compound equivalent to a compound in which n=3 in formula (I) such as monoalkoxysilane (provided that a hydrolyzable group such as a halogen is contained for the $OR_2$ moiety), can also be used in combination. In the case of using a compound equivalent to a compound in which n=0 in formula (I) such as tetraalkoxysilane and a compound equivalent to a compound in which n=3 in formula (I) such as monoalkoxysilane in combination, the amount used thereof is such that a silane compound represented by formula (I) in which n=1 or 2 is 10 or more and preferably 35 or more based on a value of 100 for the tetraalkoxysilane or monoalkoxysilane and the like in terms of the molar ratio thereof.

Specific examples of tetraalkoxysilane or monoalkoxysilanes include triphenylethoxysilane, trimethylmethoxysilane, trimethylethoxysilane, tetraethoxysilane and tetramethoxysilane. Moreover, examples of silane compounds used in the present application include halogenosilanes, specific examples of which include a chlorosilane such as methylchlorosilane, methyldichlorosilane, dimethyldichlorosilane, trimethylchlorosilane, phenyltrichlorosilane, diphenylchlorosilane, vinylchlorosilane, γ-(meth)acryloxypropyltrichlorosilane and γ-(meth)acryloxypropyldichloromethylsilane.

In the present invention, as a result of adding the compound having a silicone structure either during or after emulsion polymerization of the monomer using an emulsifier, the silane is hydrolyzed and condensed resulting in the formation of silicone in particles of the acrylate polymer emulsion.

A specific example of a method for producing the aqueous silicone-modified resin used in the present invention consists of first obtaining a preliminary aqueous acrylate polymer emulsion in which a seed latex is dispersed therein by subjecting the monomer to emulsion polymerization in the presence of an emulsifier in an aqueous medium (Step 1), obtaining the final target emulsion in the form of an aqueous acrylate polymer emulsion by adding the monomer and emulsifier to the preliminary aqueous acrylate polymer emulsion obtained according to Step 1 together with an aqueous medium as necessary (Step 2), and obtaining an aqueous silicone-modified acrylate polymer emulsion by modifying with silicone using a compound having a silicone structure either during or after emulsion polymerization.

In Step 2, silicon modification may be carried out during emulsion polymerization by adding the compound having a silicone structure, or silicon modification may be carried out after emulsion polymerization by treating the final target emulsion in the form of an aqueous acrylate polymer emulsion with the compound having a silicone structure.

In addition, the monomer and emulsifier used in Step 1 and Step 2 may be the same or different.

In the present invention, the silicon content in the aqueous silicone-modified resin is preferably 1% by weight to 10% by weight as the amount of oxide.

In the present invention, a metal salt of an organic acid such as dibutyltin dilaurate, dioctyltin dilaurate, dibutyltin diacetate, tin octylate, tin laurate, iron octylate, lead octylate or tetrabutyl titanate, or an amine compound such as n-hexylamine or 1,8-diazabicyclo[5.4.0]-7-undecene, can also be added to the aqueous silicone-modified acrylate polymer emulsion as a curing catalyst when forming the adhesive layer.

Furthermore, in the case these curing catalysts are not water-soluble, they are preferably emulsified at the time of use thereof using a surfactant and water.

The pH of an aqueous silicone-modified resin such as the aqueous silicone-modified acrylate polymer emulsion is preferably adjusted to the range of 5 to 10 using ammonia, sodium hydroxide, potassium hydroxide or an amine such as dimethylaminoethanol in order to maintain the long-term dispersion stability of the emulsion.

In addition, the mean particle diameter of a dispersoid of the aqueous silicone-modified acrylate polymer emulsion is preferably 10 nm to 1000 nm.

Components ordinarily added to and incorporated in water-based coatings and the like, such as deposition assistants, thickeners, antifoaming agents, pigments, dispersants, dyes or preservatives, can be options incorporated in the aqueous silicone-modified acrylate polymer emulsion.

Specific examples of the aqueous silicone-modified resin used in the present invention preferably include POLY-DUREX (trade name) G627S and G620 manufactured by Asahi Kasei Chemicals Co., Ltd.

The composition for forming the adhesive layer is composed of an aqueous solution containing the previously described aqueous silicone-modified resin, and can also be composed by adding a deposition assistant or organic solvent as necessary.

In the composition for forming the adhesive layer, the aqueous silicone-modified resin is preferably used at a solid content within the range of 5% by weight to 30% by weight, and is more preferably used within the range of 10% by weight to 20% by weight. If the amount of aqueous silicone-modified resin is excessively low, cissing occurs when coating the composition for forming the adhesive layer onto the carrier, thereby preventing the formation of a favorable coated film. On the other hand, if the amount of aqueous silicone-modified resin is excessively high, brush lines are formed in the coated film.

There are no particular limitations on the deposition assistant provided it improves depositability of the emulsion in particular, and preferable specific examples thereof include (poly)ethylene glycol or (poly)ethylene glycol monoalkyl ethers represented by the general formula: HO—$(CH_2CH_2O)_m$—$R_5$ (wherein, $R_5$ represents a hydrogen atom or linear or branched alkyl group having 1 to 10 carbon atoms, and m represents an integer of 1 to 5), (poly)ethylene glycol esters or (poly)ethylene glycol ether esters represented by the general formula: $R_7CO$—O—$(CH_2CH_2O)_q$—$R_6$ (wherein, $R_6$ represents a hydrogen atom or linear or branched alkyl group having 1 to 10 carbon atoms, q represents an integer of 1 to 5, and $R_7$ represents a linear or branched alkyl group having 1 to 10 carbon atoms), (poly)propylene glycol or (poly)propylene glycol monoalkyl ethers represented by the general formula: HO—$(C_3H_6O)_z$—$R_8$ (wherein, $R_8$ represents a hydrogen atom or linear or branched alkyl group having 1 to 10 carbon atoms, and r represents an integer of 1 to 5), and (poly)propylene glycol esters or (poly)propylene glycol ether esters represented by the general formula: $R_{10}CO$—O—$(C_3H_6)_s$—$R_9$ (wherein, $R_9$ represents a hydrogen atom or linear or branched alkyl group having 1 to 10 carbon atoms, s represents an integer of 1 to 5, and $R_{10}$ represents to linear or branched alkyl group having 1 to 10 carbon atoms). More specific examples include cellosolves such as methyl cellosolve, ethyl cellosolve or butyl cellosolve, ethers such as diethylene glycol monoethyl ether, diethylene glycol monobutyl ether, propylene glycol monomethyl ether, propylene glycol monoethyl ether, propylene glycol monobutyl ether, propylene glycol monoisobutyl ether, dipropylene glycol monomethyl ether, dipropylene glycol monoethyl ether, dipropylene glycol monobutyl ether, dipropylene glycol monoisobutyl ether, tripropylene glycol monomethyl ether, tripropylene glycol monoethyl ether, tripropylene glycol monobutyl ether or tripropylene glycol monoisobutyl ether, ether esters such as ethyl cellosolve acetate, butyl cellosolve acetate, diethylene glycol monoethyl ether acetate, diethylene glycol monobutyl ether acetate dipropylene glycol monomethyl ether acetate, dipropylene glycol monoethyl ether acetate, dipropylene glycol monobutyl ether acetate, tripropylene glycol monoethyl ether acetate, tripropylene glycol monobutyl ether acetate or tripropylene glycol monoisobutyl ether acetate, propylene glycol phenyl ether, propylene glycol diacetate and 2,2,4-trimethylpentanediol-1,3-monoisobutyrate. These deposition assistants can be used alone or two or more types can be used after mixing. The amount of deposition assistant used is preferably within the range of 2% by weight to 15% by weight in the composition for forming the adhesive layer. If the amount used is within the aforementioned range, the adhesive layer becomes transparent.

In addition, an organic solvent is preferably used in combination for improving wettability of the emulsion to a substrate. A water-soluble solvent is preferable for the type of organic solvent, specific examples thereof include, lower alcohols, and more specific examples include methanol, ethanol, isopropanol, n-propanol and n-butanol. The amount of solvent used is preferably within the range of by weight to 40% by weight and more preferably within the range of 20% by weight to 30% by weight in the composition for forming the adhesive layer. If the amount of ethanol added is excessively low, cissing occurs during coating, which may prevent the formation of a favorable coated film. On the other hand, if the amount of ethanol added is excessively high, the undercoated layer may be rubbed off when over coating the composition for forming the adhesive layer.

The photocatalyst layer is composed of a photocatalyst particle complex containing a metal oxide gel or metal hydroxide gel.

The metal oxide gel or metal hydroxide gel in the photocatalyst layer has the effect of fixing the photocatalyst powder and enabling it to firmly adhere to the adhesive layer.

Since the metal oxide gel or metal hydroxide gel is porous, it has adsorptivity and also demonstrates the effect of enhancing photocatalytic activity.

The content of the metal oxide gel or metal hydroxide gel in the photocatalyst layer is preferably 25% by weight to 95% by weight.

The thickness of the adhesive layer is preferably 0.5 μm to 5 μm and more preferably 1 μm to 3

EXAMPLES

Although the following provides a more detailed explanation of the present invention through examples thereof, the present invention is not limited to the following examples.

Example 1

43.5 parts by weight of an aqueous silicone-modified acrylate polymer emulsion (POLYDUREX G627S, trade name, Asahi Kasei Chemicals Co., Ltd., solid content: 46% by weight), 30 parts by weight of ethanol and 2.6 parts by weight of dipropylene glycol n-butyl ether were mixed for use as a composition for forming an adhesive layer, followed by adding water for the balance to prepare 100 parts by weight of the composition.

BISTRATOR 360C (Nippon Soda Co., Ltd.) was used as a composition for forming the photocatalyst layer.

The composition for forming the adhesive layer was coated once by brush coating onto the coated surface of a carrier in the form of a coated aluminum plate (undercoating (sealer): ESCO (white), top coating: RETAN PG80 (white), 65 mm×150 mm) followed by drying for 2 hours at room temperature to form an adhesive layer, and further coating with the photocatalyst layer forming solution by brush coating to form the photocatalyst layer and obtain a photocatalyst-carrying structure.

Example 2

A photocatalyst-carrying structure was produced in the same manner as Example 1 with the exception of using an aqueous silicone-modified acrylate polymer emulsion (POLYDUREX G620, trade name, Asahi Kasei Chemicals Co., Ltd., solid content: 46% by weight) for the composition for forming the adhesive layer.

Example 3

A photocatalyst-carrying structure was produced in the same manner as Example 1 with the exception of coating the composition for forming the adhesive layer twice (over coating) at a 10 minute interval on the coated surface of the coated aluminum plate.

Example 4

A photocatalyst-carrying structure was produced in the same manner as Example 2 with the exception of coating the composition for forming the adhesive layer twice (over coating) at a 10 minute interval on the coated surface of the coated aluminum plate.

Comparative Example 1

An acrylic-silicone resin having a silicone content of 3% by weight (glass transition temperature: 20° C.) and a partial hydrolysis product of tetramethoxysilane in the form of an oligomer having a degree of polymerization of 3 to 6 were mixed at a solid content weight ratio of 65:35, followed by diluting to a solid content concentration of 10% by weight using a mixed solvent of ethyl alcohol and ethyl acetate to prepare a composition of forming an adhesive layer.

A photocatalyst-carrying structure was then produced using the same substrate as Example 1 and using the aforementioned composition for forming an adhesive layer. Furthermore, formation of the photocatalyst layer was also carried out in the same manner as Example 1.

Test Example 1

Accelerated Weathering Test Using Sunshine Carbon Arc Weatherometer

An accelerated weathering test using a sunshine, carbon arc weatherometer as defined in JIS K5400 was carried out on the photocatalyst-carrying structures formed on the coated surface of a coated aluminum plate in Examples 1 to 4 and Comparative Example 1 using the Model S80 manufactured by Suga Test Instruments under conditions of a testing time of 1000 hours, black panel temperature of 63° C., duration of 120 cycles and 18 minutes of rainfall.

The results are shown in Table 1.

Furthermore, each of the evaluation parameters was measured in the manner described below.

<Color Difference ΔE>

Lightness and chromaticity (L*a*b*) were measured before and after testing with the Model SD5000 Spectroscopic Colorimeter manufactured by Nippon Denshoku Industries, and color difference was determined according the following equation by taking the difference thereof.

$$\Delta E \sqrt{((L_0-L_n)^2+(a_0-a_n)^2+(b_0-b_n)^2)} \quad \text{[Equation 1]}$$

(In the above equation, $L_0$ represents initial lightness, $L_n$ represents lightness during measurement, $a_0$ and $b_0$ represent initial chromaticity, and $a_n$ and $b_n$ represent chromaticity during measurement.)

<Gloss G>

Gloss was measured with the Model GMX-202 (60°) Gloss Meter manufactured by Murakami Color Research Laboratory.

<Gloss Retention Ratio>

The gloss retention ratio was determined as the ratio of the gloss after testing to the initial gloss.

<Water Contact Angle>

0.4 μl of water were dropped on using the Model 700 DropMaster manufactured by Kyowa Interface Science Co., Ltd. followed by measuring 3 seconds later and determining water contact angle as the average of three points.

TABLE 1

| Time | Color Difference ΔE | | | | | Gloss G | | | | | Gloss Retention Ratio (%) | | | | | Water Contact Angle (degrees) | | | | |
|---|---|---|---|---|---|---|---|---|---|---|---|---|---|---|---|---|---|---|---|---|
| | 0 | 250 | 500 | 750 | 1000 | 0 | 250 | 500 | 750 | 1000 | 0 | 250 | 500 | 750 | 1000 | 0 | 250 | 500 | 750 | 1000 |
| Ex. 1 | 0 | 0.32 | 0.23 | 0.31 | 0.38 | 62.5 | 53.2 | 53.0 | 48.9 | 49.0 | 100 | 85.1 | 84.8 | 79.8 | 78.4 | 16.1 | 3.9 | 4.5 | 3.8 | 3.7 |
| Ex. 2 | 0 | 0.45 | 0.38 | 0.49 | 0.50 | 62.3 | 53.3 | 52.8 | 50.1 | 50.3 | 100 | 85.6 | 84.5 | 80.4 | 80.7 | 15.9 | 2.9 | 3.2 | 3.1 | 3.4 |
| Ex. 3 | 0 | 0.46 | 0.40 | 0.35 | 0.28 | 61.9 | 52.0 | 53.3 | 49.1 | 50.4 | 100 | 84.0 | 86.1 | 79.3 | 81.4 | 14.1 | 5.6 | 3.8 | 3.5 | 4.1 |
| Ex. 4 | 0 | 0.71 | 0.36 | 0.60 | 0.54 | 61.5 | 53.2 | 51.9 | 49.2 | 48.4 | 100 | 86.1 | 84.0 | 79.6 | 78.3 | 16.4 | 3.5 | 9.2 | 3.3 | 3.4 |
| Comp. Ex. 1 | 0 | 0.53 | 0.47 | 0.51 | 0.34 | 54.3 | 48.4 | 39.9 | 33.7 | 33.6 | 100 | 89.1 | 73.5 | 62.1 | 61.9 | 15.0 | 2.7 | 4.0 | 3.2 | 2.7 |

According to the above results, the use of an aqueous silicone-modified resin was determined to allow the obtaining of a photocatalyst-carrying structure having performance equal to or better than that using an organic solvent already used practically.

INDUSTRIAL APPLICABILITY

In the present invention, as a result of using an aqueous silicone-modified resin, an adhesive layer for carrying a photocatalyst is provided that does not contain a volatile organic compound as solvent. Consequently, the adhesive layer of the present invention can be used indoors and the like in terms of the work environment. On the basis of the above, the present invention is extremely industrially useful.

The invention claimed is:

1. A photocatalyst-carrying structure comprising:
   a carrier;
   a photocatalyst layer carried on the carrier; and
   an adhesive layer formed between the carrier and the photocatalyst layer by coating the carrier with a composition for forming the adhesive layer, followed by drying;
   wherein the composition for forming the adhesive layer consists of:
   (i) an aqueous silicone-modified (meth)acrylic resin at a solid content of 10% by weight to 20% by weight, the aqueous silicone-modified (meth)acrylic resin being obtained by emulsion polymerization of a monomer in the presence of an emulsifier in an aqueous medium, and further modification with silicone using a compound having a silicone structure,
   (ii) 2% by weight to 15% by weight of at least one selected from the group consisting of (poly)ethylene glycol, (poly)ethylene glycol monoalkyl ethers, (poly)ethylene glycol esters, (poly)ethylene glycol ether esters, (poly)propylene glycol, (poly)propylene glycol monoalkyl ethers, (poly)propylene glycol esters, and (poly)propylene glycol ether esters,
   (iii) 30% by weight to 40% by weight of at least one solvent selected from the group consisting of methanol, ethanol, isopropanol, n-propanol, and n-butanol, and
   (iv) water.

2. The photocatalyst-carrying structure according to claim 1, wherein the monomer consists of a (meth)acrylate monomer selected from the group consisting of acrylic acid esters, methacrylic acid esters, and mixtures thereof, and at least one comonomer selected from the group consisting of acrylamide monomers, methacrylamide monomers, vinyl monomers, ethylenic unsaturated monomers having a carboxylic acid group, vinyl cyanides, aromatic vinyl monomers, vinyl halides, butadiene, and ethylene that is capable of copolymerizing with the (meth)acrylate monomer.

3. The photocatalyst-carrying structure according to claim 2, wherein an amount of the (meth)acrylate monomer in the monomer is 90% by weight to 100% by weight, an amount of the comonomer is 0% by weight to 10% by weight based on a total weight of the (meth)acrylate monomer and the comonomer, and the (meth)acrylate monomer contains a cycloalkyl ester of acrylic acid or (meth)acrylic acid having 5 to 12 carbon atoms, or a mixture thereof, in an amount equal to 5% by weight or more based on a total weight of the monomer.

4. The photocatalyst-carrying structure according to claim 1, wherein the emulsifier is at least one selected from the group consisting of an ethylenic unsaturated monomer having a sulfonic acid group or sulfonate group, an ethylenic unsaturated monomer having a sulfuric acid ester group, and a mixture thereof.

5. The photocatalyst-carrying structure according to claim 1, wherein the compound having a silicone structure is:
   a cyclic polysiloxane; or
   at least one selected from the group of compounds represented by the following formula (I):

$$(R_1)_n Si(OR_2)_{4-n} \qquad (I)$$

wherein:
   $R_1$ represents a hydrogen atom, an aliphatic hydrocarbon group having 1 to 16 carbon atoms, an aryl group having 6 to 10 carbon atoms, a heteroaryl group having 4 to 5 carbon atoms, an aralkyl group having 7 to 11 carbon atoms, a cycloalkyl group having 5 to 6 carbon atoms, a vinyl group, or a (meth)acroyloxyalkyl group having 1 to 10 carbon atoms,
   $R_2$ represents an alkyl group having 1 to 8 carbon atoms, an acyl group, or a hydrogen atom,
   n represents 1 or 2, and
   in the case n is 2, $R_1$ may be the same or different or $R_1$ may mutually bond to form a ring, and $R_2$ may be the same or different.

6. The photocatalyst-carrying structure according to claim 5, wherein the compound having a silicone structure is a mixture of at least one selected from the group consisting of compounds in which n is 1 in formula (I) and at least one selected from the group consisting of compounds in which n is 2.

7. The photocatalyst-carrying structure according to claim 6, wherein, in the compound having a silicone structure, a ratio between the at least one selected from the group consisting of compounds in which n is 1 in formula (I) and the at least one selected from the group consisting of compounds in which n is 2 is a molar ratio of 1/10 or more.

8. The photocatalyst-carrying structure according to claim 1, wherein the photocatalyst layer is composed of a photocatalyst particle complex containing 25% by weight to 95% by weight of a metal oxide gel or metal hydroxide gel.

9. The photocatalyst-carrying structure according to claim 1, wherein a thickness of the adhesive layer is 0.5 μm to 5 μm.

* * * * *

UNITED STATES PATENT AND TRADEMARK OFFICE
CERTIFICATE OF CORRECTION

PATENT NO. : 9,919,301 B2
APPLICATION NO. : 14/359863
DATED : March 20, 2018
INVENTOR(S) : Kazunori Saito It is certified that error appears in the above-identified patent and that said Letters Patent is hereby corrected as shown below:

In the Specification

In Column 8, Lines 59-60, "within the range of by weight to 40% by weight" should read --within the range of 10% by weight to 40% by weight--.

Signed and Sealed this
Fifth Day of June, 2018

Andrei Iancu
*Director of the United States Patent and Trademark Office*